May 26, 1964  M. CALTHORPE  3,134,198
EXTENSIBLE VEHICLE ROOF
Filed May 8, 1961  3 Sheets-Sheet 1
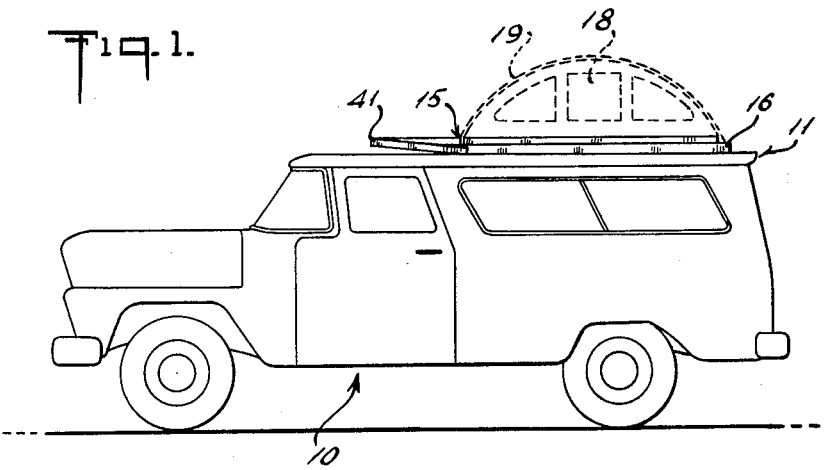
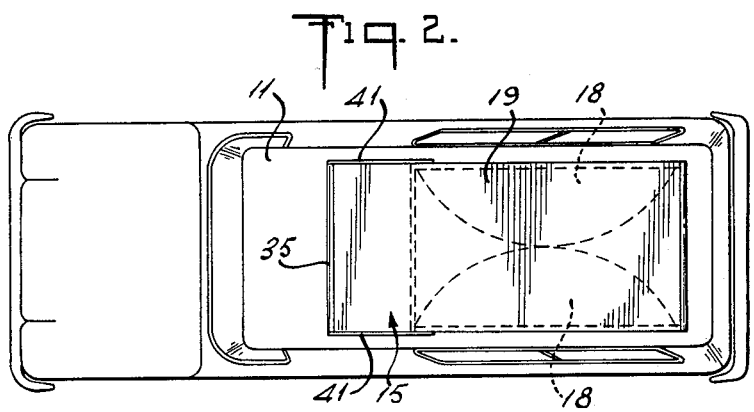
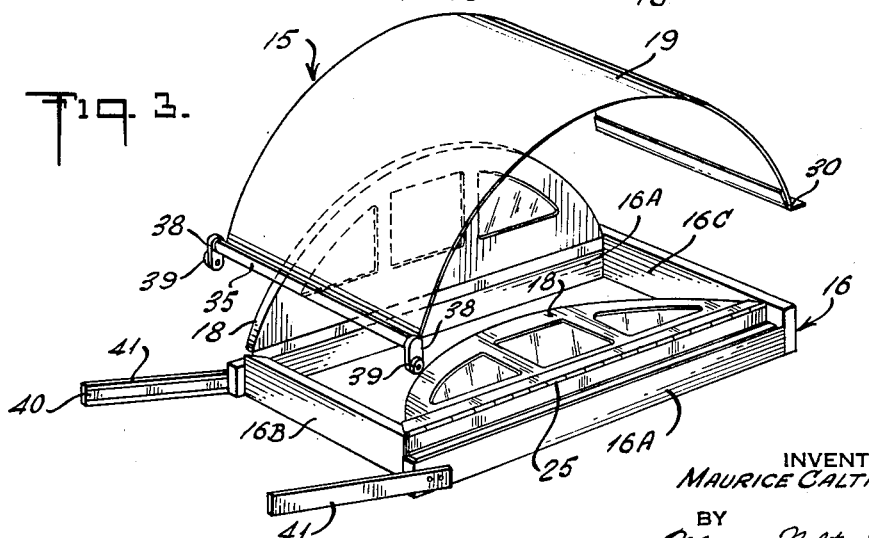
INVENTOR
MAURICE CALTHORPE
BY
Moses, Nolte, & Nolte
ATTORNEYS

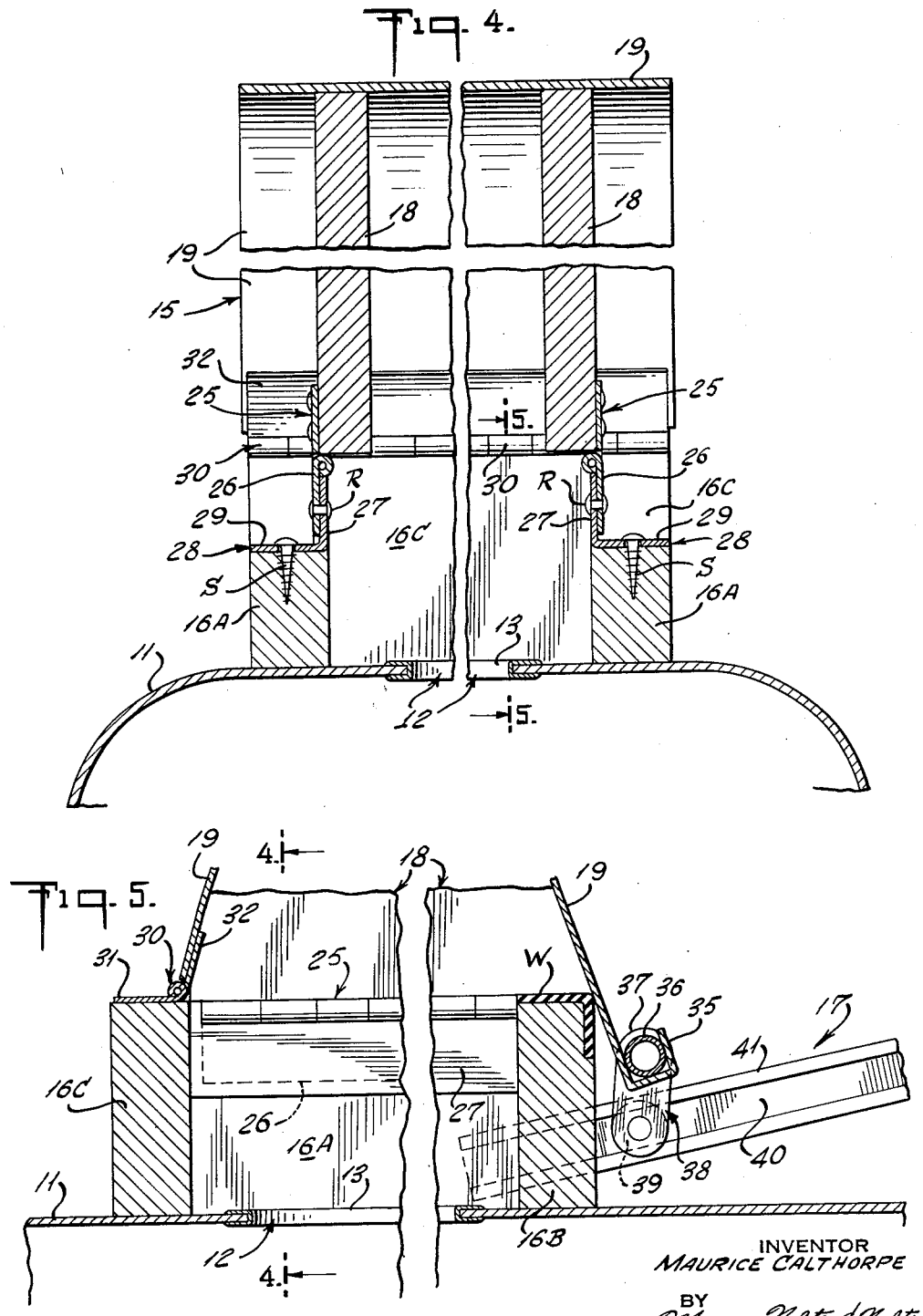

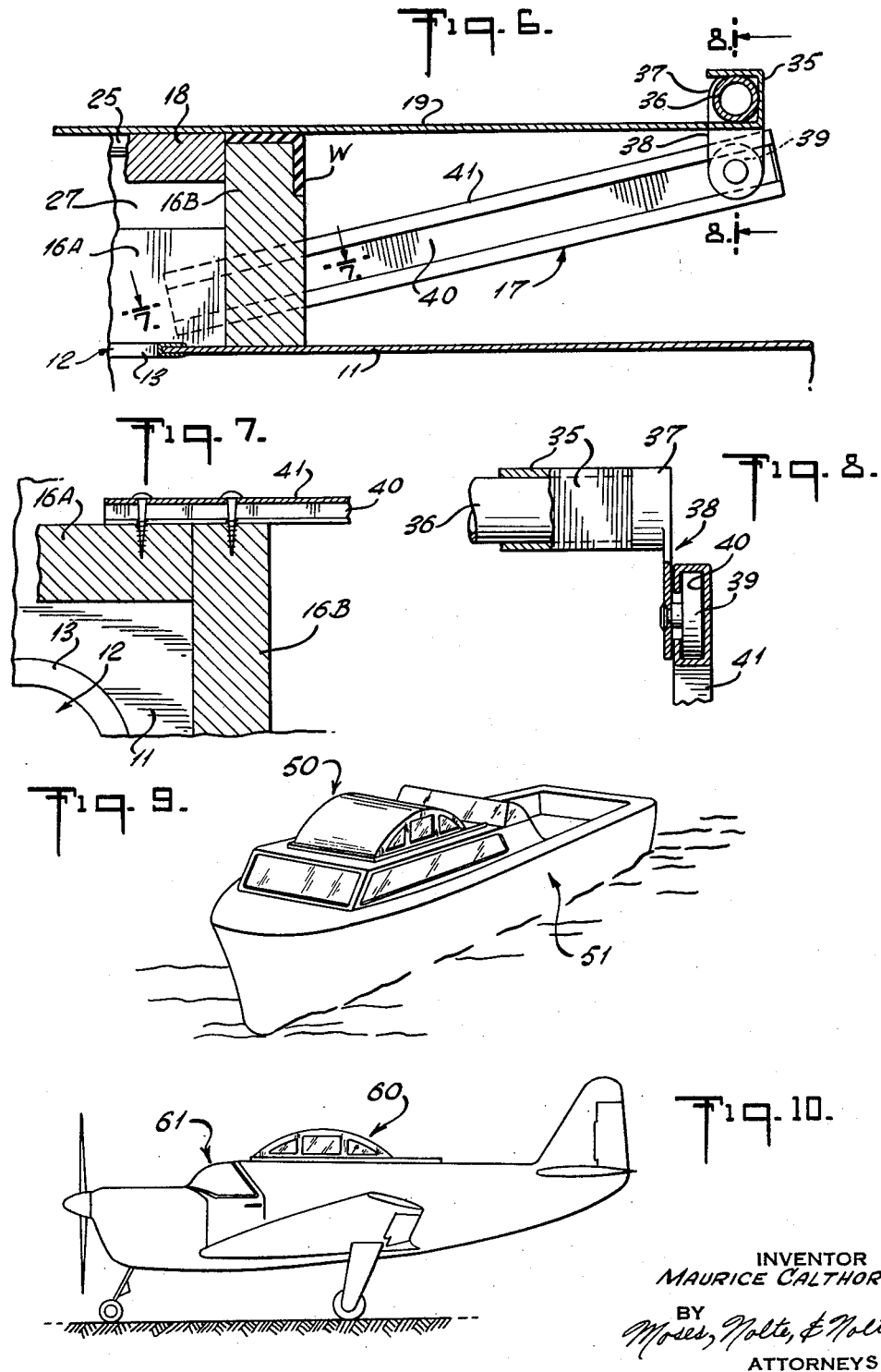

United States Patent Office 3,134,198
Patented May 26, 1964

3,134,198
EXTENSIBLE VEHICLE ROOF
Maurice Calthorpe, Hotel Wyndham, 42 W. 58th St.,
New York, N.Y.
Filed May 8, 1961, Ser. No. 128,280
3 Claims. (Cl. 50—117)

This invention relates to extensible roof constructions for increasing the vertical area in various types of vehicles.

It is an object of this invention to provide an extensible and collapsible roof of novel construction for increasing the head room or vertical storage space in relatively small vehicles when desired.

It is an object of this invention to provide such a roof construction which is readily adapted to convert the passenger or lading area of comparatively small vehicles, such as the rear seating areas of station wagons, or the cabins of motor launches or trailers or caravans or airplanes, into comfortable living quarters or into lading areas by providing additional head room in excess of the normal vertical dimensions of the vehicle before conversion.

It is a further object of this invention to provide such a roof construction which is simple in design, easily and economically applied in converting standard vehicles, is easily operated and is economical to fabricate.

In accordance with the invention there is provided a structure which is preferably in the form of an assembly for attachment to the existing roof of a vehicle, the latter having been prepared for conversion purposes by providing an opening to receive the roof construction, or around the edges of which the roof construction may be attached. The assembly includes a roof panel of flexible and preferably resilient material, such as sheet metal, normally describing a flat plane and extending over the opening in the roof. The panel is hingedly attached at one of its ends adjacent the vehicle roof structure and movably mounted at its other end by guide means extending endwardly of the roof panel and outboard of the assembly. The guide means extends sufficiently to accommodate the full length of the panel and is arranged with the movable end of the panel to permit movement thereof toward and away from the hinged end.

A pair of side panels are hinged or otherwise conveniently provided at either side of the roof opening and describe congruent arcs with their free edges. These panels underlie the flexible panel and when swung upwardly, force the flexible panel into the form of an arched roof as the movably mounted end of the flexible panel is forced inwardly.

Other objects and the many advantages of the invention will be better understood by referring to the following description of a specific embodiment of the invention with reference being had to the drawings of which:

FIG. 1 is a side elevational view of a station wagon type vehicle incorporating the extensible roof structure of the invention;

FIG. 2 is a plan view of the vehicle shown in FIG. 1;

FIG. 3 is a perspective view of an extensible roof structure assembly in accordance with the invention and showing the extensible flexible portion of the roof exploded away from the base, side panels and guide element of the assembly;

FIG. 4 is a transverse sectional view taken along the line 4—4 of FIG. 5 and showing the top of the vehicle of FIGS. 1 and 2 with the extensible roof structure of the invention in the open position;

FIG. 5 is a longitudinal sectional view taken along the line 5—5 of FIG. 4;

FIG. 6 is a longitudinal sectional detail view of the guide elements of the extensible roof structure;

FIG. 7 is a sectional view taken along the line 7—7 of FIG. 6;

FIG. 8 is a sectional view taken along the line 8—8 of FIG. 6;

FIG. 9 is a perspective view showing the invention as applied to a motor launch; and FIG. 10 is a side elevational view of an airplane in which the cabin thereof has been provided with an extensible roof in accordance with the invention.

In FIG. 1, there is shown a station wagon type vehicle 10 in which the roof 11 thereof has been cut away at a central rearward position to provide a cut out area 12. As best seen in FIG. 4, a finishing trim 13 edges the opening to provide a finished appearance and to protect against rough edge protrusion.

An extensible roof assembly 15 is positioned over the opening 12 and comprises a rectangular base frame 16 with its longitudinal axis disposed lengthwise of the vehicle 10, a forwardly and upwardly extending roof panel guide element 17 at the front end of the base 16, a pair of side panels 18 hinged on either side of the base 16 and a rectangular flexible roof panel 19 hinged at its rear end to the base 16 and movably mounted at its other end by the roof panel guide element 17.

The base 16 may be secured to the roof 11 of the vehicle in any convenient manner such as by bolts, or clamps, not shown, and is positioned so that its side sections 16A and front and rear end sections 16B, 16C, respectively, are supported outwardly of the open area 12. It should be understood that the base 16 and roof 11 may be formed to accommodate an inside fitting of the base 16 within the aperture 12. It will also be appreciated that the roof 11 of the vehicle 10 may be utilized as a base for directly securing the side panels 18, the rear end of the roof panel 19 and the guide element 17. The construction shown is particularly desirable inasmuch as it is a prefabricated structure which can be used to readily and quickly convert an existing solid piece roof vehicle into, for instance, a caravan type of conveyance.

The side panels 18 are arcuately formed along their upper edges and as so shaped assist in properly shaping the flexible roof panel 19 during the extending operations, as will be fully described, and act to support the panel 19 in arcuate disposition when in the open position (FIGS. 3–5). The lower edges of the side panels 18 are hinged to the sides 16A of the base via piano type hinges 25 (FIGS. 3 and 4), the stationary elements 26 of which are riveted, as at R, along their longitudinal length to the inner vertical legs 27 of outwardly facing L brackets 28, the horizontal legs 29 of which are secured to the upper edges of the base sides 16A via wood screws S (FIG. 4 only). Inward rotation of the side panels 18 at the end of the closing is restrained when the panels assume a horizontal position in which the hinged end of the panels will contact the inner surface of the vertical leg 29 of the panel support brackets 28 at that point.

In the present construction, and as best seen in the dotted indications in FIG. 2, the side panels 18 are transversely dimensioned so that their free edges will barely contact when they are swung via their hinged connections to the base to the closed or down position. This eliminates the more expensive type of installation which utilizes an overlapping disposition of side panels.

The rear end of the flexible roof panel 19 is, as previously stated, hinged to the rear end piece 16C and in the embodiment shown, this connection is accomplished via a piano type hinge 30, the stationary element 31 of which is secured along the top edge of the base rear end piece 16C by means of screws or the like, not shown. The movable element 32 of the hinge 30 is secured along the rear end of the roof panel 19 by welding or the like.

The front edge of the roof panel 19 is bent outwardly and is provided with a return flange so that a channel-shaped retainer portion 35 is formed for receiving and substantially securing therewithin a transversely extending operating bar 36. The ends of the bar 36 are received within the hubs 37 (FIGS. 6 and 8) of a pair of transversely spaced links 38 and are rotatable relative thereto. Each link 38 provides a roller element 39 rotationally mounted at the other end thereof and disposed for longitudinal rolling movement, relative to the vehicle, within transversely spaced channel grooves 40 formed in the transversely spaced guide tracks 41 of the guide element 17. The rear ends of the guide tracks 41 are secured via wood screws (FIG. 7) to the sides 16A of the frame which extend below the plane of the side panels 18 at the upper edges thereof.

The tracks 41 are angularly oriented with respect to the horizontal so that they extend upwardly and forwardly of the base 16 so that their free ends lie above the horizontal plane of the end pieces 16B, 16C, of the frame, which as shown in FIGS. 4 and 5 lie above the hinged connection of the side panels 18 to the frame sides 16A. This orientation of the tracks 41 permits the free end of the roof panel 19 to be raised as the panel is unflexed during closing operation to permit horizontal disposition of the panel 19 in the closed position in which its front end rests on a weather strip W provided along the top and top front edges of the front end piece 16C. (FIG. 6.) On the other hand, as the panel 19 is being flexed to bow upwardly, as will be presently described, the front end of the panel 19 is guided rearwardly and downwardly so that the inner surface of the free end will be disposed below the upper edge of the front end piece 16C and will also contact the weather stripping W but at an angle to the horizontal (FIG. 5).

In order to take care of lateral weather sealing, there may be provided longitudinally extending weather strips in the form of sponge-like elements (not shown) along either side of the panel 19 and disposed so that they would lie outboard of the side panels 18 when they are in the up position and outboard of the stationary elements 26 of the side panel hinges 18 when the panel 19 is closed and the side panels 18 are turned inwardly.

The operation of the extensible roof of the invention is very simple in that all that is required for the user to do to extend the head room area is to lift the side panels 18 so that they will rotate upwardly and outwardly. This movement will flex the roof panel 19 upwardly, its front end being forced along the guide means 17 via their tracks 41 and roller 40 interconnection, and will form the panel into the arcuate open position shown in FIG. 1 (in phantom), 3, 4, 5, 9 and 10. As the contacting surfaces of the side panels 18 and roof panel 19 are smooth and arcuate, sliding movement of the two elements relative to and over one another is readily accommodated without excessive friction.

When the side panels 18 are drawn inwardly toward their horizontal closed position, the front end of the extensible roof panel 19 will slide via the roller 40 and the track 41 elements toward the flattened closed position, shown in FIG. 6. This self-flattening activity of the roof panel 19 results from the combination of gravity forces and the internal resilient characteristics of the sheet metal panel itself. Handle means, not shown, on the roof panel 19 may be provided to assist in the opening and closing operations, and may be desirable where the relaxed condition of a roof panel of any given material may not conform precisely to a horizontal posture, or where the material used does not provide sufficient resiliency in a bowed position to effect a total flattening when released. Securing elements, not shown, for locking the panel in the horizontal or raised position may also be provided.

FIGS. 9 and 10 are shown to illustrate that the invention is readily adapted for all types of vehicle conversion where more head room is desirable. FIG. 9 shows the roof structure of the invention 50 as applied to a motor launch 51, while FIG. 10 shows the same type of structure 60 of the invention as applied to the cabin of an airplane 61.

Although a specific embodiment of the invention has been depicted and described herein, many modifications of the structures noted will occur to those skilled in the art and such modifications need not necessarily result in a structure not contemplated by the invention. Therefore, the full spirit and scope of the invention are to be defined only by the following claims.

I claim:

1. An extensible roof assembly for disposition on top of a vehicle over an opening in the top thereof, said assembly including a substantially rectangular base having longitudinal and transverse members, a pair of upstanding side panels hingedly secured to respective longitudinal base members, an elongated roof, flexible over its entire length, hingedly secured at one end to one of said transverse members and supported at its sides on top of said side panels in a bowed configuration, the length of said roof panel being greater than the length of said base, a pair of elongated track members extending outwardly past said other transverse member a distance sufficient to accommodate the length of said roof panel in excess of said frame, roller elements adapted to ride in said track members, and a transverse bar coupled to said roller elements and connected from the other end of said roof panel, whereby, when said side panels are pivoted downwardly, said flexible roof collapses to a flat position guided by the outward movement of said roller elements in said track members.

2. An extensible roof assembly according to claim 1, wherein said other end of said roof panel includes a hooked portion adapted to releaseably engage said transverse bar to enable interconnection between said roof and said bar.

3. An extensible roof assembly according to claim 2, wherein there is further provided vertical link members between the ends of said transverse bar and respective ones of said roller elements.

References Cited in the file of this patent

UNITED STATES PATENTS

| | | |
|---|---|---|
| 1,206,506 | Boynton | Nov. 28, 1916 |
| 1,603,181 | Aborn | Oct. 12, 1926 |
| 2,783,079 | Kurka | Feb. 26, 1957 |
| 2,926,042 | Calthorpe | Feb. 23, 1960 |

FOREIGN PATENTS

| | | |
|---|---|---|
| 731,838 | Germany | Feb. 17, 1943 |
| 328,950 | Great Britain | May 7, 1930 |
| 404,912 | Great Britain | Jan. 25, 1934 |
| 444,907 | Great Britain | Mar. 31, 1936 |